C. E. GILLETT.
CORN HANGER.
APPLICATION FILED MAR. 26, 1919.
1,351,379.
Patented Aug. 31, 1920.
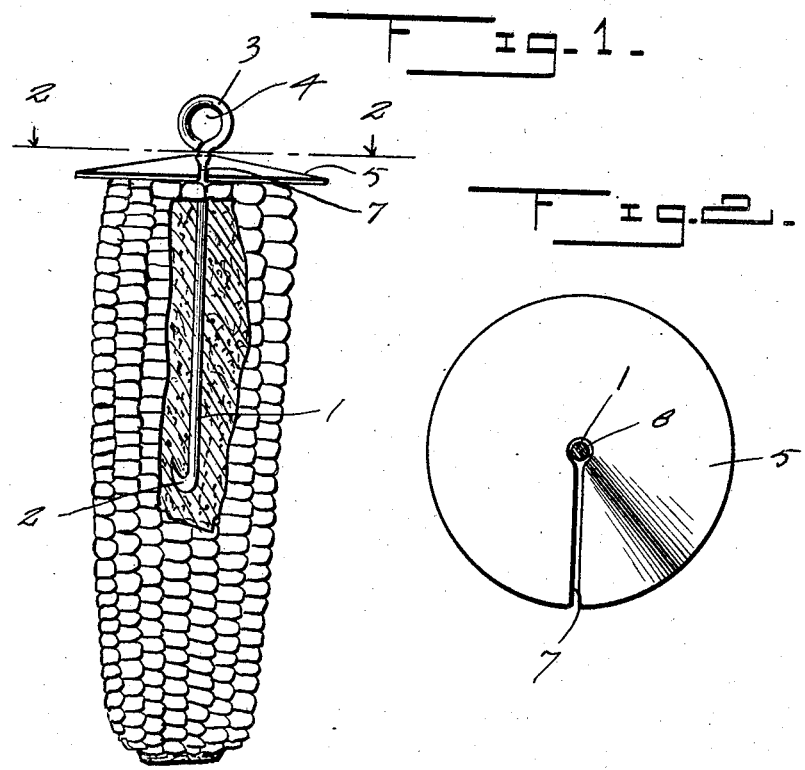
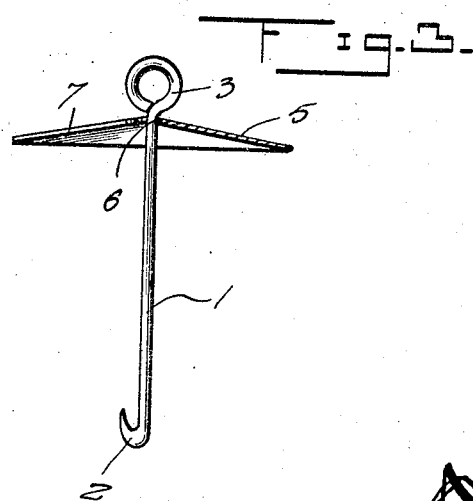
Inventor
C. E. Gillett,
By
Attorney

UNITED STATES PATENT OFFICE.

CLIFTON ELROY GILLETT, OF VERDIGRE, NEBRASKA.

CORN-HANGER.

1,351,379. Specification of Letters Patent. Patented Aug. 31, 1920.

Application filed March 26, 1919. Serial No. 285,228.

*To all whom it may concern:*

Be it known that I, CLIFTON ELROY GILLETT, a citizen of the United States, residing at Verdigre, in the county of Knox and State of Nebraska, have invented certain new and useful Improvements in Corn-Hangers; and I do hereby declare the following to be a full, clear, and exact description of the invention, such as will enable others skilled in the art to which it appertains to make and use the same.

This invention relates to improvements in corn hangers, and has for one of its objects the provision of a device of this character, whereby an ear of corn can be readily suspended from a hook or like support, so that the kernels thereof can be dried for obtaining seed corn.

Another object of this invention is the provision of a guard on the supporting means adapted to prevent mice, rats and the like from descending said supporting means onto the ear of corn.

A further object of this invention is the provision of a corn hanger of the above stated character, which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference will be had to the following description and accompanying drawing, in which:

Figure 1 is a side elevation of a corn hanger constructed in accordance with my invention, illustrating the same supporting an ear of corn, Fig. 2 is a sectional view, taken on the line 2—2 of Fig. 1, Fig. 3 is a vertical sectional view, illustrating a slot in the guard.

Referring in detail to the drawing, the numeral 1 indicates a rod or shank, having one end bent to form a hook 2, the bill portion of which is pointed, so that upon inserting the shank or rod into the cob of the ear of corn, illustrated in Fig. 1, the hook 2 will bite into the same and prevent the rod or shank from being accidentally withdrawn therefrom. The other end of the rod or shank 1 is bent to form an eye 3, adapted to receive a hook or like support 4 for supporting the ear of corn in a suspended position, as shown in Fig. 1.

A substantially conical shaped guard 5 is provided with an opening 6 in the central or apex portion thereof to receive the rod or shank 1, and is also provided with a slot 7, which extends from the opening 6 through the periphery of the guard for the purpose of permitting the shank or rod to be removed and replaced in the opening 6 when desired. The width of the slot 7 is less than the thickness of the rod or shank 1, so that it is necessary to force the rod or shank through the slot before the same can enter the opening 6. By having the slot of this size prevents the guard from becoming accidentally detached from the shank or rod. The normal position of the guard 5 is disposed between the eye 3 and the upper end of the ear of corn, so that the upper end of the ear of corn fits within the concave portion of the guard, while the convexed face presents an inclined surface to prevent rats or mice obtaining a footing thereon, thus preventing them from reaching around the periphery of the guard to obtain the kernels upon the cob.

While I have shown and described the preferred embodiment of my invention, it will be understood that minor changes in construction, combination and arrangement of parts may be made without departing from the spirit and scope of the invention as claimed.

Having thus described my invention, what I claim is:

A corn hanger comprising an ear supporting element, and a conical shaped guard having an opening in its apex receiving the supporting element, said guard having a slot extending from the opening through the periphery thereof to give said guard flexibility and said slot being of a width smaller than the diameter of the supporting element.

In testimony whereof I affix my signature in presence of two witnesses.

CLIFTON ELROY GILLETT.

Witnesses:
J. W. FLEMMING,
FRED SCHREIBER.